US012602095B2

(12) United States Patent　　　(10) Patent No.: US 12,602,095 B2
Wakayama　　　　　　　　　　　　(45) Date of Patent: Apr. 14, 2026

(54) MOVING DEVICE

(71) Applicant: TOYOTA JIDOSHA KABUSHIKI KAISHA, Toyota (JP)

(72) Inventor: Yuki Wakayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 363 days.

(21) Appl. No.: 18/525,853

(22) Filed: Dec. 1, 2023

(65) Prior Publication Data

US 2024/0231450 A1　　Jul. 11, 2024

(30) Foreign Application Priority Data

Jan. 10, 2023　(JP) ................................. 2023-001997

(51) Int. Cl.
　*G06F 1/20*　　　　(2006.01)
　*G10L 15/22*　　　　(2006.01)
(52) U.S. Cl.
　CPC .............. *G06F 1/203* (2013.01); *G10L 15/22* (2013.01)
(58) Field of Classification Search
　CPC ................................. G06F 1/203; G10L 15/22
　See application file for complete search history.

(56) References Cited

U.S. PATENT DOCUMENTS

| | | | |
|---|---|---|---|
| 6,194,858 B1 * | 2/2001 | Chen ................... | H05K 7/20209 |
| | | | 388/903 |
| 11,720,154 B2 * | 8/2023 | Stevens ................. | F04D 29/663 |
| | | | 713/300 |
| 2006/0143017 A1 | 6/2006 | Sonoura et al. | |
| 2016/0013745 A1 * | 1/2016 | North .................... | H02P 7/2913 |
| | | | 318/460 |
| 2019/0126157 A1 | 5/2019 | Hayashi | |
| 2019/0391828 A1 | 12/2019 | Tokuhashi | |
| 2022/0230641 A1 | 7/2022 | Do | |
| 2023/0173683 A1 | 6/2023 | Gomez | |

FOREIGN PATENT DOCUMENTS

| | | | | |
|---|---|---|---|---|
| CN | 114714398 A | * | 7/2022 | .............. B25J 19/00 |
| JP | 2006-181651 A | | 7/2006 | |
| JP | 2011-044374 A | | 3/2011 | |
| JP | 2020-003925 A | | 1/2020 | |
| JP | 2022-029599 A | | 2/2022 | |
| JP | 2022-111977 A | | 8/2022 | |
| WO | 2018/012219 A1 | | 1/2018 | |

* cited by examiner

*Primary Examiner* — James Sanders
(74) *Attorney, Agent, or Firm* — SOLARIS Intellectual Property Group, PLLC

(57)　　　　　ABSTRACT

A moving device includes: a main body portion that includes a plurality of movement mechanisms; a sound collecting portion that is provided at the main body portion and that is configured to collect peripheral sounds; a controller that is configured to control the plurality of movement mechanisms and the sound collecting portion; an air circulation device that cools the controller by circulating air toward the controller, wherein, in a case in which noise in sound collected by the sound collecting portion is greater than or equal to a predetermined value, the controller is configured to stop the air circulation device.

5 Claims, 6 Drawing Sheets

24 (10)

| PERIPHERAL INFORMATION ACQUISITION SECTION | 62 |

| MOVEMENT MECHANISM CONTROL SECTION | 64 |

| PERSON DETERMINATION SECTION | 66 |

| MICROPHONE CONTROL SECTION | 68 |

| SPEECH APPROXIMATING SECTION | 70 |

| NOTIFICATION SECTION | 72 |

| MODE SWITCHING SECTION | 74 |

| FAN CONTROL SECTION | 76 |

MOVING DEVICE

CROSS-REFERENCE TO RELATED APPLICATION

This application is based on and claims priority under 35 USC 119 from Japanese Patent Application No. 2023-001997, filed on Jan. 10, 2023, the disclosure of which is incorporated by reference herein.

BACKGROUND

Technical Field

The present disclosure relates to a moving device.

Related Art

Japanese Patent Application Laid-Open (JP-A) No. 2020-003925 discloses a dialogue system including a touch panel, a speech input device, and a speech output device. More specifically, in the dialogue system described in Japanese Patent Application Laid-Open (JP-A) No. 2020-003925, after starting guidance, the dialogue mode is switched and controlled for each dialogue according to the situation of the user.

Incidentally, a moving device including a dialogue system such as that of Japanese Patent Application Laid-Open (JP-A) No. 2020-003925 is known. Such a moving device needs to control not only the dialogue system, but also a movement mechanism, sensors that detect the surroundings, and the like, and the temperature of the control unit may rise due to a processing load. As a countermeasure against this, an air circulation device such as a cooling fan can be provided, but there is a possibility of speech collection being affected by an operating sound or the like of the air circulation device.

SUMMARY

The present disclosure provides, in a moving device that is capable of collecting peripheral sounds, a moving device that can effectively collect sounds.

A moving device according to a first aspect includes: a main body portion that includes plural movement mechanisms; a sound collecting portion that is provided at the main body portion and that is configured to collect peripheral sounds; a control unit that is configured to control the plural movement mechanisms and the sound collecting portion; an air circulation device that cools the control unit by circulating air toward the control unit, wherein, in a case in which noise in sound collected by the sound collecting portion is greater than or equal to a predetermined value, the control unit is configured to stop the air circulation device.

In the moving device according to the first aspect, the main body portion includes plural movement mechanisms and the sound collecting portion. This enables speech to be collected by the moving device moving to an arbitrary location, such as a location at which a person is present. The control unit, which controls the plural movement mechanisms and the sound collecting portion, is cooled by circulating air from the air circulation device. This enables the heat of the control unit to be suppressed from rising even in a case in which the processing load on the control unit has increased.

Moreover, in a case in which the noise in the sound collected by the sound collecting portion is greater than or equal to a predetermined value, the control unit stops the air circulation device. This enables generation of noise caused by operation of the air circulation device to be suppressed, enabling speech to be effectively collected.

A moving device according to a second aspect is the moving device according to the first aspect, wherein: the moving device further includes a sensor that is provided at the main body portion and that is configured to detect a peripheral object; and the sound collecting portion is configured to collect sound in response to the sensor detecting a person as the peripheral object.

In the moving device according to the second aspect, the sound collecting portion is configured to collect sound in response to the sensor detecting a person as the peripheral object. This enables collection of speech to not be performed in a situation in which a person is not present, and the processing load of the control unit to be reduced.

A moving device according to a third aspect is the moving device according to the second aspect, wherein, in a case in which noise in the sound collected by the sound collecting portion is greater than or equal to a predetermined value, the moving device moves toward the person detected by the sensor.

In the moving device according to the third aspect, in a case in which noise is greater than or equal to a predetermined value, approaching a person who is speaking enables speech to be more accurately collected.

A moving device according to a fourth aspect is the moving device according to the second aspect, wherein: the moving device further includes a sound output portion that is provided at the main body portion and that outputs sound to a periphery of the moving device; and in a case in which the peripheral object detected by the sensor is a notification target, the moving device provides a notification via the sound output portion.

The moving device according to the fourth aspect can interact with the notification target by providing a predetermined notification to the notification target.

A moving device according to a fifth aspect is the moving device according to the first aspect, wherein the moving device approximates a meaning indicated by speech by inputting speech data collected by the sound collecting portion into a learning model that has undergone machine learning based on speech data and meanings indicated by the speech data.

In the moving device according to the fifth aspect, the meaning indicated by the speech is approximated using a machine learning model, enabling the meaning of the speech to be approximated more accurately than in a case in which the meaning is approximated based solely on stored speech.

The moving device according to the present disclosure enables effective sound collection in a moving device capable of collecting peripheral sounds.

BRIEF DESCRIPTION OF THE DRAWINGS

An exemplary embodiment of the present disclosure will be described in detail based on the following figures, wherein.

DETAILED DESCRIPTION

Figure 1:
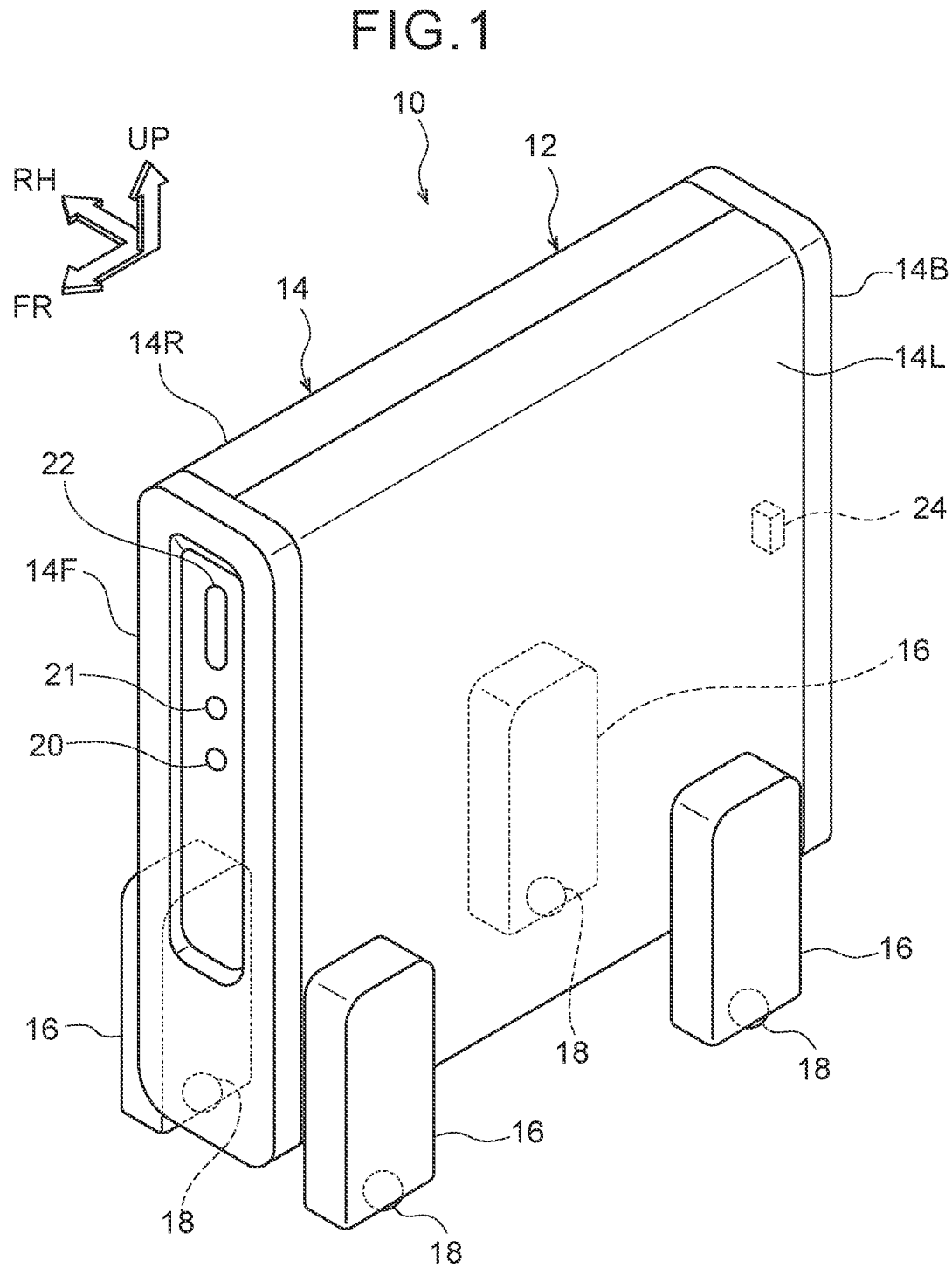
FIG. 1 is a perspective view of a moving device according to an exemplary embodiment, and is a diagram illustrating a state of a normal mode.

Explanation follows regarding a moving device 10 according to an exemplary embodiment, with reference to the drawings. Note that the arrow UP, the arrow FR, and the arrow RH illustrated as appropriate in the drawings respectively indicate an upward direction of the moving device 10, a forward direction (a direction of movement) of the moving device 10, and a rightward direction of the moving device 10. In the following explanation, unless otherwise specified, reference to merely a front-rear direction, a left-right direction, and a vertical direction means the front-rear direction of the moving device 10, the left-right direction of the moving device 10, and the vertical direction of the moving device 10, respectively.

Overall Configuration of the Moving Device 10

As illustrated in FIG. 1, the moving device 10 of the present exemplary embodiment includes a main body portion 12. The main body portion 12 is formed in a vertically long substantially rectangular parallelepiped shape, and includes a housing 14.

The housing 14, which configures the main body portion 12, includes a front cover portion 14F and a rear cover portion 14B. The front cover portion 14F and the rear cover portion 14B are disposed so as to face each other in the front-rear direction, and are each formed in a vertically long plate shape with a front-rear direction serving as a plate thickness direction.

A right cover portion 14R and a left cover portion 14L are respectively provided between the front cover portion 14F and the rear cover portion 14B. The right cover portion 14R configures the right half of the housing 14, and includes a planar portion that extends in the front-rear direction and the vertical direction. The right cover portion 14R includes a portion that extends leftward from an upper end of the planar portion so as to connect an upper end of the front cover portion 14F and an upper end of the rear cover portion 14B, and a portion that extends leftward from a lower end of the planar portion so as to connect a lower end of the front cover portion 14F and a lower end of the rear cover portion 14B.

The left cover portion 14L configures the left half of the housing 14, and includes a planar portion that extends in the front-rear direction and the vertical direction. The left cover portion 14L includes a portion that extends rightward from an upper end of the planar portion so as to connect the upper end of the front cover portion 14F and the upper end of the rear cover portion 14B, and a portion that extends rightward from a lower end of the planar portion so as to connect the lower end of the front cover portion 14F and the lower end of the rear cover portion 14B. Namely, the left cover portion 14L and the right cover portion 14R are symmetrical in shape to each other. As an example, in the present exemplary embodiment, the right cover portion 14R is fixed to the front cover portion 14F and the rear cover portion 14B. The left cover portion 14L is configured so as to be movable between a normal position in contact with the front cover portion 14F and the rear cover portion 14B, and a deployed position to the left of the front cover portion 14F and the rear cover portion 14B.

Note that the right cover portion 14R and the left cover portion 14L are each provided with leg portions 16. More specifically, one leg portion 16 is provided at the front of a lower portion of the right cover portion 14R and one leg portion 16 is provided at the back of the lower portion of the right cover portion 14R, and one leg portion 16 is provided at the front of a lower portion of the left cover portion 14L, and one leg portion 16 is provided at the back of the lower portion of the left cover portion 14L. Accordingly, the moving device 10 of the present exemplary embodiment is provided with four leg portions 16.

Each of the four leg portions 16 is provided with a roller 18 serving as a movement mechanism. The four rollers 18 are respectively configured so as to be rotatable in all directions, and therefore, the moving device 10 is capable of moving in all directions without changing its orientation.

A microphone 20 serving as a sound collecting portion, a speaker 21 serving as a sound output portion, and a camera 22 serving as a sensor are provided at the front cover portion 14F of the housing 14. The microphone 20 is configured so as to be capable of collecting sound from around the main body portion 12. Note that a directional microphone may be adopted as the microphone 20. In this case, in particular, speech spoken from in front of the moving device 10 can be effectively collected. Although explanation follows regarding a configuration that includes one microphone 20 in the present exemplary embodiment, a configuration that includes plural microphones 20 may be adopted. For example, if the microphone 20 is installed so as to have directionality in the front direction, the rear direction, the left direction, and the right direction of the main body portion 12, the direction of an utterance can be identified.

The speaker 21 is provided at the main body portion 12 and is configured so as to be capable of outputting sound to a periphery of the moving device 10. Note that a directional speaker may be adopted as the speaker 21. In this case, it is possible to provide a notification to only people who are in front of the moving device 10. Although explanation follows regarding a configuration that includes one speaker 21 in the present exemplary embodiment, a configuration that includes plural speakers 21 may be adopted. For example, if the speaker 21 is installed so as to have directionality in the front direction, the rear direction, the left direction, and the right direction of the main body portion 12, sound can be output in an arbitrary direction without changing the orientation of the moving device 10.

The camera 22 is configured so as to be capable of detecting an object at a periphery of the main body portion 12. Note that in addition to the camera 22, an ultrasonic sensor and a LiDAR (light detection and ranging, or laser imaging, detection, and ranging) sensor may be installed as sensors for peripheral detection. In particular, it is preferable to use a sensor that is capable of widely detecting obstructions around the main body portion 12.

The rollers 18, the microphone 20, the speaker 21, the camera 22, and the like are controlled by a control unit 24 that is provided inside the housing 14 of the moving device 10. Further, the main body portion 12 is provided with a non-illustrated battery, and is configured so as to operate various functions when power is supplied from the battery.

Figure 2:
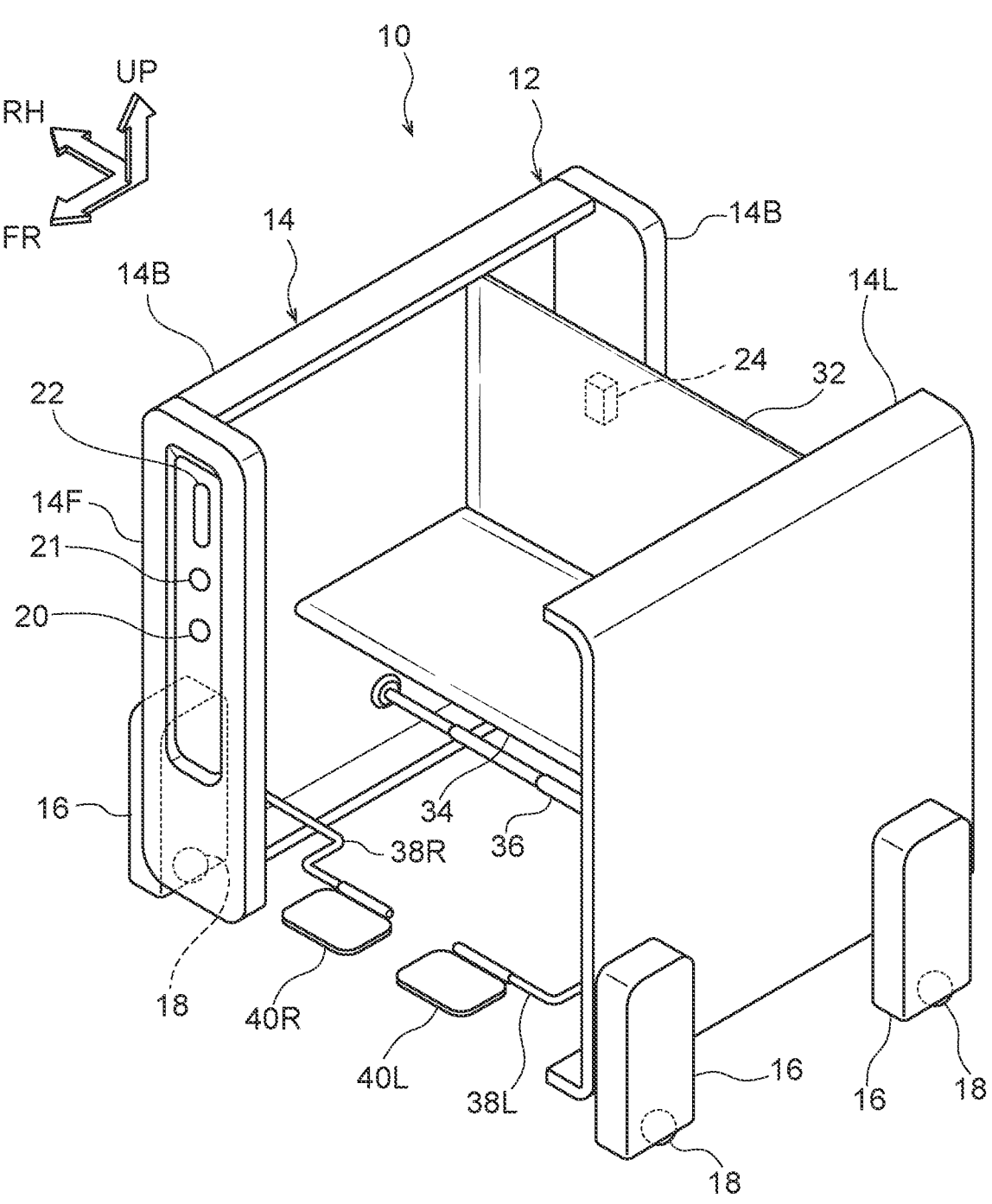
FIG. 2 is a perspective view of a moving device according to an exemplary embodiment, and is a diagram illustrating a state of a wheelchair mode.

Note that as an example, the moving device 10 of the present exemplary embodiment is configured so as to be deformable from the normal mode illustrated in FIG. 1 to the wheelchair mode illustrated in FIG. 2.

As illustrated in FIG. 2, in the wheelchair mode, the left cover portion 14L of the housing 14 is moved to the deployed position. For example, in a state in which a locked state of the left cover portion 14L is released, the left cover portion 14L is moved to the deployed position by the rotation of the respective rollers 18 provided at the left cover portion 14L.

Moreover, in the wheelchair mode, a backrest portion 32 and a seat surface portion 34 are in a state of being stretched between the right cover portion 14R and the left cover portion 14L. The backrest portion 32 and the seat surface portion 34 are formed of, for example, a cloth material, and are stored in a folded state inside the housing 14 in the normal mode.

Moreover, a non-illustrated rod, which is extendable with a left-right direction of the main body portion 12 serving as a longitudinal direction, is provided at an upper end portion of the backrest portion 32, one end portion of the rod being fixed to the right cover portion 14R, and another end portion of the rod being fixed to the left cover portion 14L. A similar rod is provided at a connecting portion between the backrest portion 32 and the seat surface portion 34, as well as at a front end portion of the seating surface portion 34. The respective rods are biased in the direction of extension, so that the rods extend when the left cover portion 14L is deployed, and the backrest portion 32 and the seat surface portion 34 are deployed.

A rod 36 that connects the right cover portion 14R and the left cover portion 14L is provided below the seat surface portion 34. A right frame 38R having a substantially crank shape is provided at a front portion of the right cover portion 14R, and a right foot rest 40R is attached to the right frame 38R. Similarly, a left frame 38L having a substantially crank shape is provided at a front portion of the left cover portion 14L, and a left foot rest 40L is attached to the left frame 38L.

The wheelchair mode of the moving device 10 of the present exemplary embodiment is configured as described above, and is configured such that a user is able to use the moving device 10 as a wheelchair in a state in which the user is seated on the seat surface portion 34.

Hardware Configuration of the Moving Device 10

Figure 3:
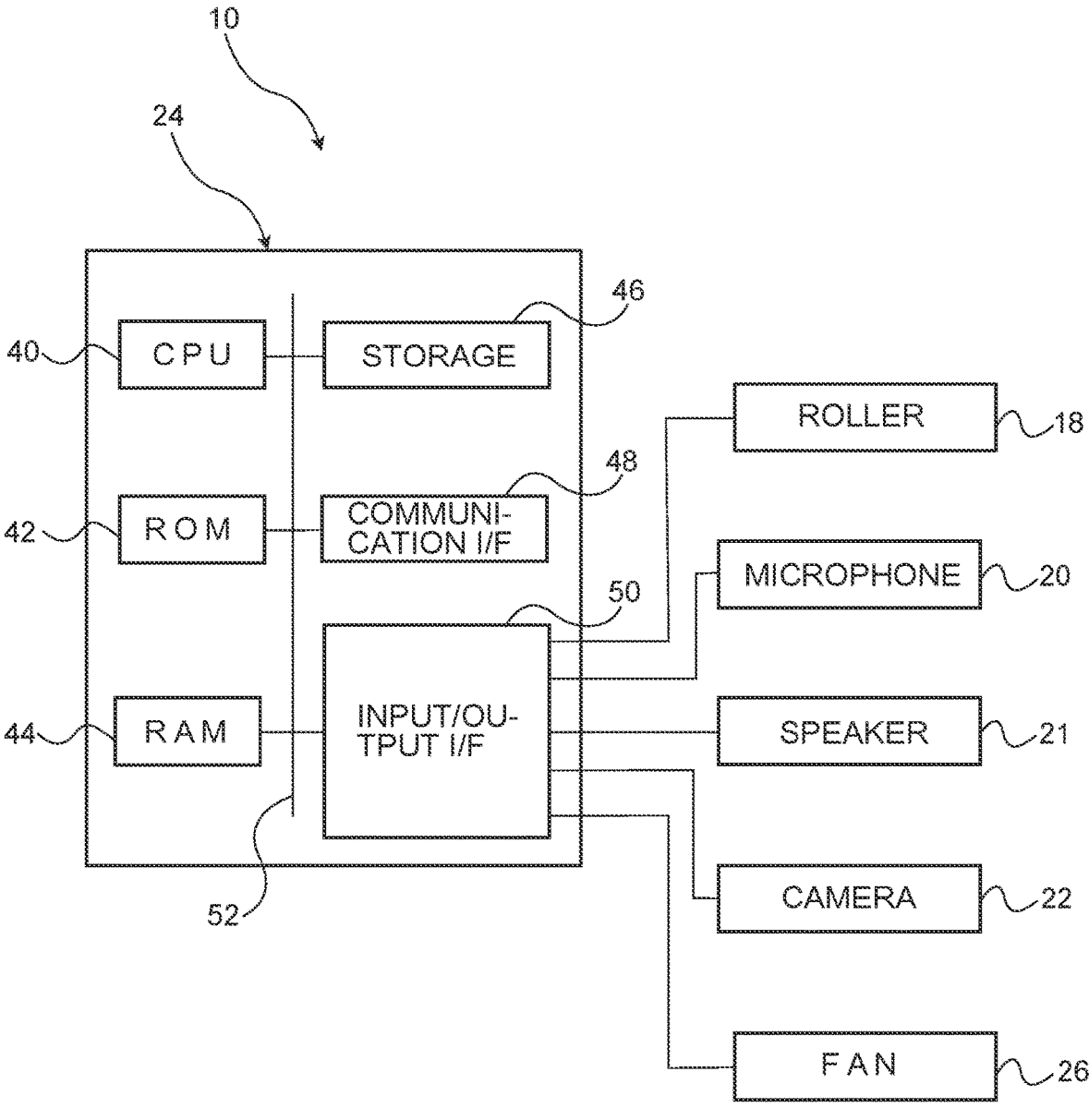
FIG. 3 is a block diagram illustrating a hardware configuration of a moving device in an exemplary embodiment.

FIG. 3 is a block diagram illustrating a hardware configuration of the moving device 10. As illustrated in FIG. 3, the control unit 24, which configures the moving device 10, includes a central processing unit (CPU; serving as a processor) 40, read only memory (ROM) 42, random access memory (RAM) 44, storage 46, a communication interface (communication I/F) 48, and an input/output interface (input/output I/F) 50. These respective configurations are communicably connected to each other via an internal bus 52.

The CPU 40 is a central processing unit that executes various programs and controls various components. Namely, the CPU 40 reads a program from the ROM 42 or the storage 46, and executes the program using the RAM 44 as a workspace. Further, the CPU 40 controls the respective configurations described above and performs a variety of computation processing in accordance with programs stored in the ROM 42 or the storage 46.

The ROM 42 stores various programs and various data. The RAM 44 serves as a workspace to temporarily store programs and data. The storage 46 is configured by a hard disk drive (HDD) or a solid state drive (SSD), and stores various programs including an operating system, as well as various data. In the present exemplary embodiment, a program, various data, and the like for performing sound collecting processing, notification processing, and the like are stored in the ROM 42 or the storage 46.

The communication I/F 48 is an interface for the moving device 10 to communicate with an external server and other devices and, for example, a protocol such as a controller area network (CAN), Ethernet (registered trademark), long term evolution (LTE), a fiber distributed data interface (FDDI), or Wi-Fi (registered trademark) is used.

The input/output I/F 50 is electrically connected to the rollers 18, the microphone 20, the speaker 21, the camera 22, and the fan 26 serving as an air circulation device. The fan 26 is disposed in the vicinity of the control unit 24, and is a device that cools the control unit 24 by circulating air toward the control unit 24. For example, the control unit 24 activates the fan 26 in a case in which the temperature of the control unit 24, which is detected by a non-illustrated temperature sensor, has become higher than a predetermined temperature. Moreover, in a case in which the temperature of the control unit 24 has dropped below a predetermined temperature, the fan 26 is stopped.

Functional Configuration of the Moving Device 10

The moving device 10 implements various functions using the hardware resources illustrated in FIG. 3. Explanation follows regarding functional configurations implemented by the moving device 10, with reference to FIG. 4.

Figure 4:
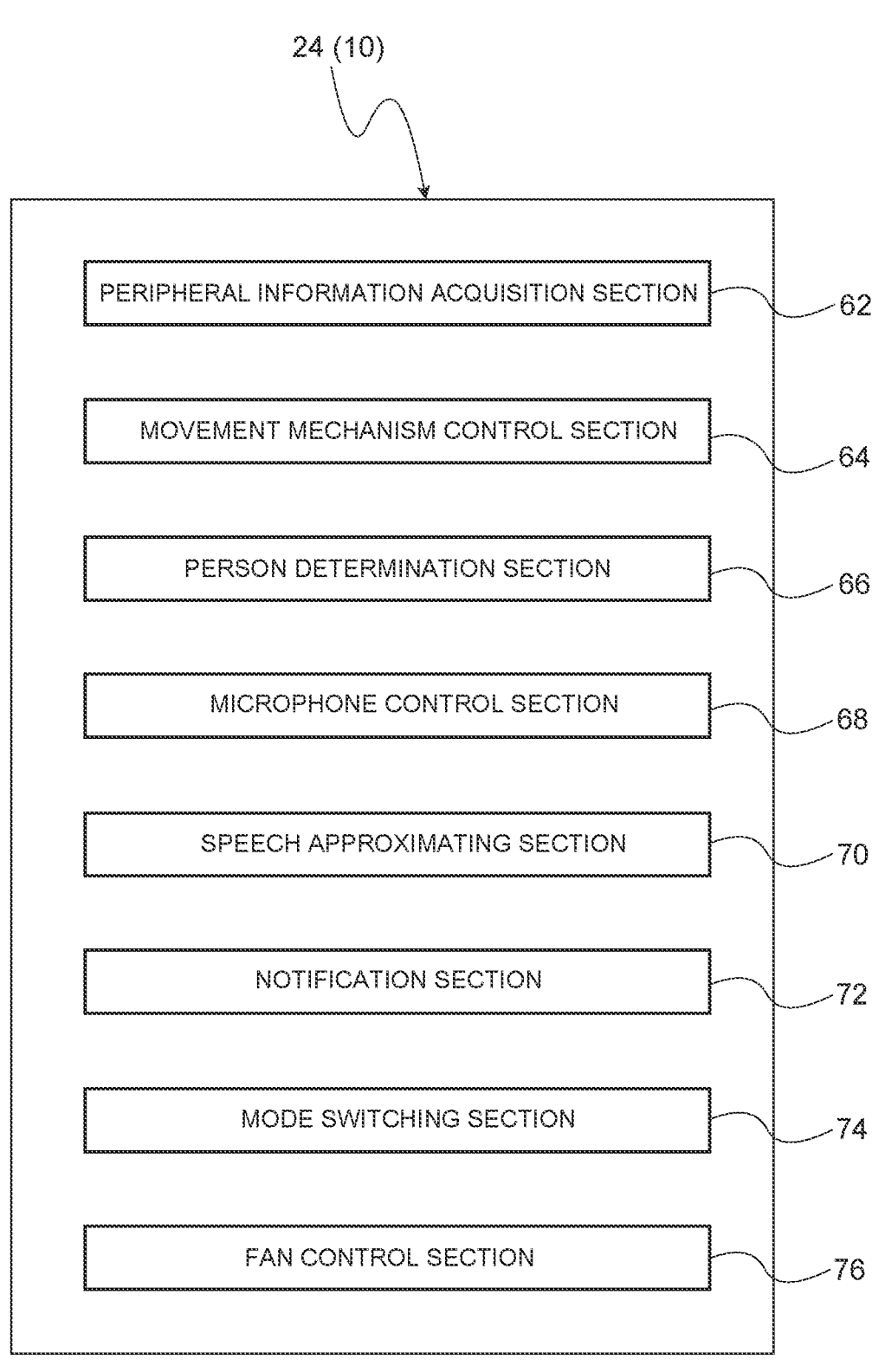
FIG. 4 is a block diagram illustrating a functional configuration of a moving device according to an exemplary embodiment.

As illustrated in FIG. 4, the functional configuration of the moving device 10 includes a peripheral information acquisition section 62, a movement mechanism control section 64, a person determination section 66, a microphone control section 68, a speech approximating section 70, a notification section 72, a mode switching section 74, and a fan control section 76. Note that the respective functional configurations are implemented by the CPU 40 reading and executing a program stored in the ROM 42 or the storage 46.

The peripheral information acquisition section 62 acquires peripheral information of the moving device 10. More specifically, the peripheral information acquisition section 62 acquires peripheral information acquired by sensors such as the camera 22.

The movement mechanism control section 64 controls the rollers 18 serving as movement mechanisms. The four rollers 18 are controlled so that the moving device 10 can be moved in an arbitrary direction. Alternatively, the main body 12 may be rotated. In a case in which noise in the sound collected by the microphone 20 is greater than or equal to a predetermined value, the movement mechanism control section 64 may cause the moving device 10 to move toward the person detected by the camera 22.

The person determination section 66 determines whether or not a person is present at a periphery of the moving device 10 from the peripheral information of the moving device 10 which is acquired by the peripheral information acquisition section 62. Moreover, in a case in which a notification target person has been set in advance, the person determination section 66 may determine whether or not a person at the periphery of the moving device 10 is a notification target person.

In a case in which a predetermined condition is satisfied, the microphone control section 68 causes the microphone 20 to collect sound from the periphery of the moving device 10 and transmit the collected sound to the control unit 24. For example, the microphone control section 68 may start collecting sound in a case in which a person is present at the periphery of the moving device 10. Alternatively, for example, in a case in which the microphone 20 has directionality, sound collection may be started in a case in which a person is present in front of the moving device 10. Moreover, in a case in which a person is not present at a periphery of the moving device 10, the microphone control section 68 may stop the sound collection using the microphone 20.

The speech approximating section 70 approximates the content spoken by a person from the speech collected by the microphone 20. For example, the speech approximating section 70 may approximate the content spoken by a person by inputting the speech data collected by the microphone 20 to a learning model that has undergone machine learning based on speech data and the meanings indicated by the speech data. In this case, the learning model is stored in the storage 46, an external server, or the like.

Moreover, the speech approximating section 70 performs analysis on noise in the collected speech data. Namely, the speech approximating section 70 distinguishes speech spoken by a person from other noise in the speech data. Moreover, the speech approximating section 70 determines whether or not the level of noise is greater than or equal to a predetermined value.

The notification section 72 provides a notification to the notification target via the speaker 21. For example, in a case in which an instruction has been received from a person at the periphery of the moving device 10, the person who gave the instruction is recognized as the notification target. The notification section 72 then provides a notification to the person who is the notification target by outputting a sound from the speaker 21 so as to respond to the instruction. It may be configured such that, as the content of the notification, content corresponding to the instruction is selected from among patterns stored in advance in the storage 46 or the like.

The mode switching section 74 switches between the normal mode and the wheelchair mode. More specifically, in a case in which switching to the wheelchair mode is required, the mode switching section 74 switches from the normal mode to the wheelchair mode. In a case in which after the user has been moved to a predetermined location in the wheelchair mode, the user has risen from the wheelchair, and has left the moving device 10, the mode switching section 74 switches to the normal mode.

The fan control section 76 controls operation of the fan 26 and stops the fan 26. More specifically, in a case in which noise of the sound collected by the microphone 20 is greater than or equal to a predetermined value, the fan control section 76 stops the fan 26. Moreover, the fan control section 76 may restart the fan 26 in a case in which there is no need to collect sound.

Operation

Next, explanation follows regarding operation of the present exemplary embodiment.

Sound Collecting Processing

Figure 5:
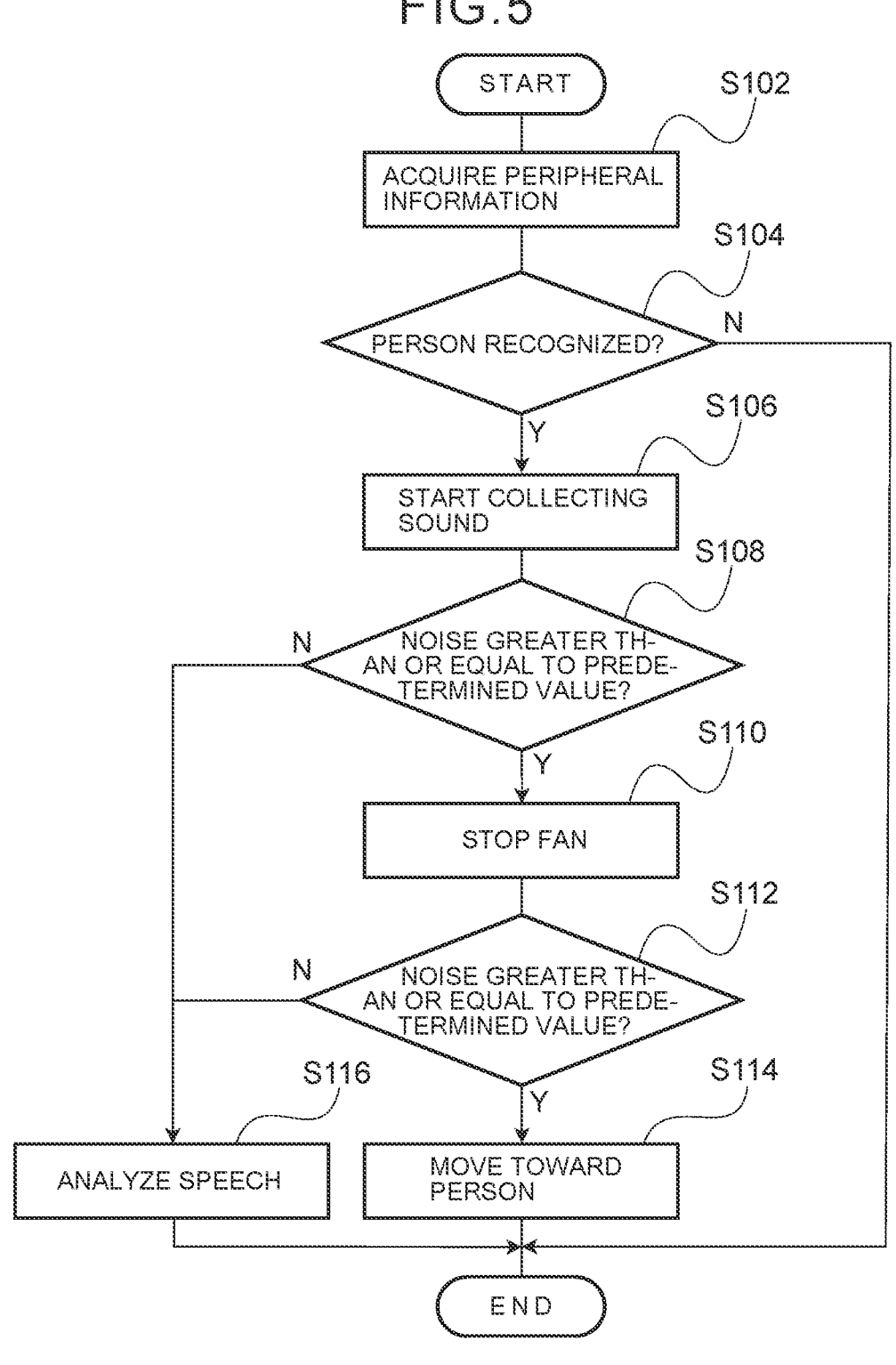
FIG. 5 is a flowchart illustrating an example of a flow of sound collecting processing in an exemplary embodiment.

Explanation follows regarding an example of a flow of sound collecting processing performed by the moving device 10, with reference to the flowchart illustrated in FIG. 5. Note that this processing is implemented by the CPU 40 reading and executing a program stored in the ROM 42 or the storage 46. Moreover, in the present exemplary embodiment, as an example, sound collecting processing is executed at predetermined intervals.

At step S102, the CPU 40 acquires peripheral information. More specifically, using the functionality of the peripheral information acquisition section 62, the CPU 40 acquires peripheral information detected by the camera 22 and other sensors.

The CPU 40 then determines whether or not a person has been recognized at step S104. More specifically, in a case in which a person has been detected from image information acquired at step S102 by the functionality of the person determination section 66, the CPU 40 determines that a person is present at a periphery of the moving device 10, and transitions to the processing of step S106. Moreover, in a case in which a person is not detected at a periphery of the moving device 10 at step S104, the CPU 40 ends the sound collecting processing. Namely, in the present exemplary embodiment, as an example, sound collection is not performed in a situation in which a person is not present at a periphery of the moving device 10.

The CPU 40 starts collecting sound at step S106. More specifically, using the functionality of the microphone control section 68, the CPU 40 turns on the microphone 20. Further, in a case in which the microphone 20 has been turned on immediately after the activation of the moving device 10, at step S106, the microphone control section 68 starts sound collection by capturing the speech data collected by the microphone 20.

At step S108, the CPU 40 determines whether or not the noise is greater than or equal to a predetermined value. More specifically, using the functionality of the speech approximating section 70, the CPU 40 extracts noise from the collected speech data at a periphery of the moving device 10, and determines whether or not the level of noise is greater than or equal to a predetermined value.

In a case in which the CPU 40 determines at step S108 that the level of the noise is greater than or equal to the predetermined value, the processing transitions to step S110. Moreover, in a case in which the CPU 40 determines at step S108 that the level of the noise is not greater than or equal to the predetermined value, namely in a case in which the CPU 40 determines that the noise is less than the predetermined value, the processing transitions to step S116. Explanation follows regarding processing of step S110 onwards, followed by explanation regarding processing of step S116 onwards.

At step S110, the CPU 40 stops the fan 26. More specifically, the CPU 40 stops the fan 26 in a case in which the fan 26 is being operated by the functionality of the fan control section 76. Moreover, in a state in which the fan 26 is stopped, the fan control section 76 maintains a state in which the fan 26 is stopped. Namely, even in a case in which the temperature of the control section 68 has increased, the fan 26 is not operated and is maintained in a stopped state.

At step S112, the CPU 40 determines whether or not the noise is greater than or equal to a predetermined value. More specifically, using the functionality of the speech approximating section 70, the CPU 40 extracts noise from the speech data collected at a periphery of the moving device 10, and determines whether or not the level of noise is greater than or equal to a predetermined value. The speech data from which noise is extracted is speech data collected after the fan 26 is stopped at step S110.

In a case in which the level of noise is determined to be greater than or equal to the predetermined value even in a case in which the fan 26 is stopped, the CPU 40 transitions to the processing of step S114. At step S114, the CPU 40 causes the moving device 10 to move toward a person. More specifically, using the functionality of the movement mechanism control section 64, the CPU 40 controls the rollers 18 so as to move the moving device 10 in a direction approaching a person who is speaking. At this time, the CPU 40 may cause the moving device 10 to move a predetermined distance from the current position. Alternatively, the CPU 40 may cause the moving device 10 to move until the distance between the moving device 10 and a person is a predetermined distance.

On the other hand, in a case in which the CPU 40 determines at step S108 that the noise is less than the predetermined value, the processing transitions to step S116. Similarly, in a case in which the CPU 40 determines at step S112 that the noise is less than the predetermined value, the processing transitions to step S116. The CPU 40 performs speech analysis at step S116. More specifically, the CPU 40 uses the functionality of the speech approximating section 70 to approximate the content spoken by a person from the speech collected by the microphone 20.

Notification Processing

Figure 6:
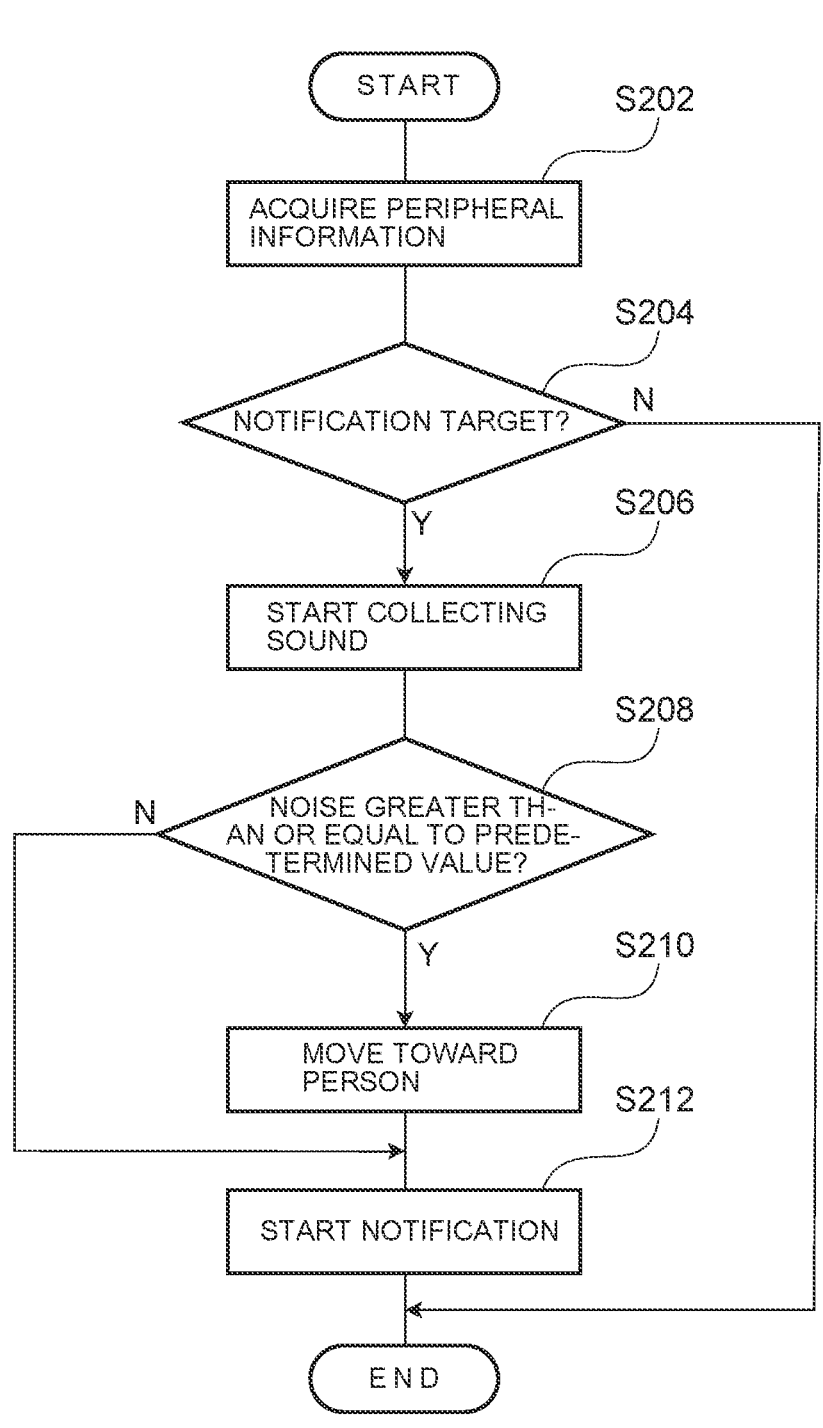
FIG. 6 is a flowchart illustrating an example of a flow of notification processing in an exemplary embodiment.

Next, explanation follows regarding an example of a flow of notification processing performed by the moving device 10, with reference to the flowchart illustrated in FIG. 6. Note that this processing is implemented by the CPU 40 reading and executing a program stored in the ROM 42 or the storage 46. Moreover, in the present exemplary embodiment, as an example, notification processing is executed in a case in which content for which notification is to be provided has arisen.

At step S202, the CPU 40 acquires peripheral information. More specifically, using the functionality of the peripheral information acquisition section 62, the CPU 40 acquires peripheral information detected by the camera 22 and other sensors.

The CPU 40 then determines whether or not a notification target has been recognized at step S204. More specifically, in a case in which a notification target has been detected from image information acquired at step S202 by the functionality of the person determination section 66, the CPU 40 transitions to the processing of step S206. Further, in a case in which a notification target is not detected at a periphery of the moving device 10 at step S204, the CPU 40 ends the notification processing.

The CPU 40 starts collecting sound at step S206. More specifically, using the functionality of the microphone control section 68, the CPU 40 turns on the microphone 20. Further, in a case in which the microphone 20 has been turned on immediately after the activation of the moving device 10, at step S206, the microphone control section 68 starts sound collection by capturing the speech data collected by the microphone 20.

At step S208, the CPU 40 determines whether or not noise is greater than or equal to a predetermined value. More specifically, using the functionality of the speech approximating section 70, the CPU 40 extracts noise from the collected speech data at a periphery of the moving device 10, and determines whether or not the level of noise is greater than or equal to a predetermined value.

In a case in which the CPU 40 determines at step S208 that the level of the noise is greater than or equal to the predetermined value, the processing transitions to step S210. Moreover, in a case in which the CPU 40 determines at step S208 that the level of the noise is not greater than or equal to the predetermined value, namely in a case in which the CPU 40 determines that the noise is less than the predetermined value, the processing transitions to step S212.

At step S210, the CPU 40 causes the moving device 10 to move toward the person. More specifically, using the functionality of the movement mechanism control section 64, the CPU 40 controls the rollers 18 so as to move the moving device 10 in a direction approaching the notification target. At this time, the CPU 40 may cause the moving device 10 to move a predetermined distance from the current position. Alternatively, the CPU 40 may cause the moving device 10 to move until the distance between the moving device 10 and the notification target is a predetermined distance.

The CPU 40 starts the notification at step S212. More specifically, using the functionality of the notification section 72, the CPU 40 provides a notification via the speaker 21 to the notification target.

As described above, according to the moving device 10 of the present exemplary embodiment, the main body portion 12 includes the rollers 18, which configure the movement mechanisms, and the microphone 20. This enables speech to be collected by the moving device 10 moving to an arbitrary location, such as a location at which a person is present. Moreover, the control unit 24 is cooled by circulating air from the fan 26. This enables the heat of the control unit 24 to be suppressed from rising even in a case in which the processing load on the control unit 24 has increased.

Moreover, in the present exemplary embodiment, in a case in which the noise in the sound collected by the microphone 20 is greater than or equal to a predetermined value, the control unit 24 stops the fan 26. This enables generation of noise caused due to operation of the fan 26 to be suppressed, enabling speech to be effectively collected.

Moreover, in the present exemplary embodiment, in a case in which an object detected by a sensor such as the camera 22 is a person, sound is collected by the microphone 20. This enables the processing load of the control unit 24 to be reduced because speech collection is not performed in a situation in which a person is not present or the like. Note that in the present exemplary embodiment, in particular, in a case in which the noise is greater than or equal to a predetermined value, approaching a person who is speaking enables speech to be more accurately collected.

Moreover, in the present exemplary embodiment, the functionality of the notification section 72 enables a dialogue by providing a predetermined notification to a notification target. When the speaker wishes to move, switching to the wheelchair mode enables the speaker who has difficulty walking to be supported.

Moreover, in the present exemplary embodiment, the meanings indicated by the speech is approximated using a learning model that has undergone machine learning. This enables the meanings of the speech to be approximated more accurately than in a case in which the meanings are approximated based on only speech stored in advance.

Although explanation has been given regarding the moving device 10 according to an exemplary embodiment, obviously various embodiments may be implemented within a range not departing from the gist of the present disclosure. For example, although the moving device 10 of the above-described exemplary embodiment has a structure that is switchable between the normal mode and the wheelchair mode, there is no limitation thereto, and the moving device 10 of the above-described exemplary embodiment may have a structure that does not allow switching to the wheelchair mode.

Further, although the moving device 10 is formed in a substantially rectangular parallelepiped shape in the above-described exemplary embodiment, there is no limitation thereto, and another shape may be adopted. For example, the shape of a humanoid robot may be adopted. Although explanation has been given regarding a structure including four rollers 18 as movement mechanisms in the present exemplary embodiment, there is no limitation thereto. For example, a movement mechanism such as a caterpillar may be provided. Alternatively, a bipedal walking or quadrupedal walking movement mechanism may be provided.

In addition, although various data is stored in the storage 46 in the above-described exemplary embodiment, there is no limitation thereto. For example, a non-transitory storage medium such as a compact disc (CD), a digital versatile disc (DVD), or universal serial bus (USB) memory may act as a storage section. In this case, various programs, data, and the like are stored in these storage media.

Moreover, the flow of processing described in the above-described exemplary embodiment is an example, and unnecessary steps may be deleted, new steps may be added, or the processing order may be rearranged within a range not departing from the spirit of the present disclosure.

What is claimed is:

1. A moving device, comprising:
a main body portion that includes a plurality of movement mechanisms;
a sound collecting portion that is provided at the main body portion and that is configured to collect peripheral sounds;
a controller that is configured to control the plurality of movement mechanisms and the sound collecting portion;
an air circulation device that cools the controller by circulating air toward the controller,
wherein, in a case in which noise in sound collected by the sound collecting portion is greater than or equal to a predetermined value, the controller is configured to stop the air circulation device.

2. The moving device according to claim 1, wherein:
the moving device further comprises a sensor that is provided at the main body portion and that is configured to detect a peripheral object; and
the sound collecting portion is configured to collect sound in response to the sensor detecting a person as the peripheral object.

3. The moving device according to claim 2, wherein, in a case in which noise in the sound collected by the sound collecting portion is greater than or equal to a predetermined value, the moving device moves toward the person detected by the sensor.

4. The moving device according to claim 2, wherein:
the moving device further comprises a sound output portion that is provided at the main body portion and that outputs sound to a periphery of the moving device; and
in a case in which the peripheral object detected by the sensor is a notification target, the moving device provides a notification via the sound output portion.

5. The moving device according to claim 1, wherein:
the moving device approximates a meaning indicated by speech by inputting speech data collected by the sound collecting portion into a learning model that has undergone machine learning based on speech data and meanings indicated by the speech data.

* * * * *